Figure 1:
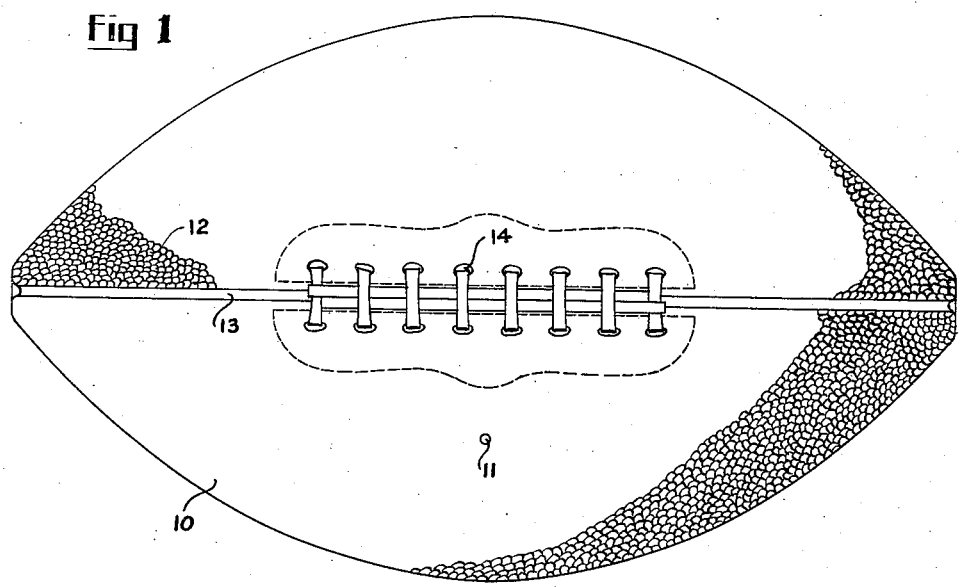

March 5, 1940.　　　F. H. SCHAVOIR　　　2,192,507

METHOD OF MAKING RUBBER ARTICLES

Filed Aug. 19, 1935　　　2 Sheets-Sheet 1

INVENTOR
F. H. Schavoir
ATTORNEY

March 5, 1940.  F. H. SCHAVOIR  2,192,507
METHOD OF MAKING RUBBER ARTICLES
Filed Aug. 19, 1935   2 Sheets-Sheet 2
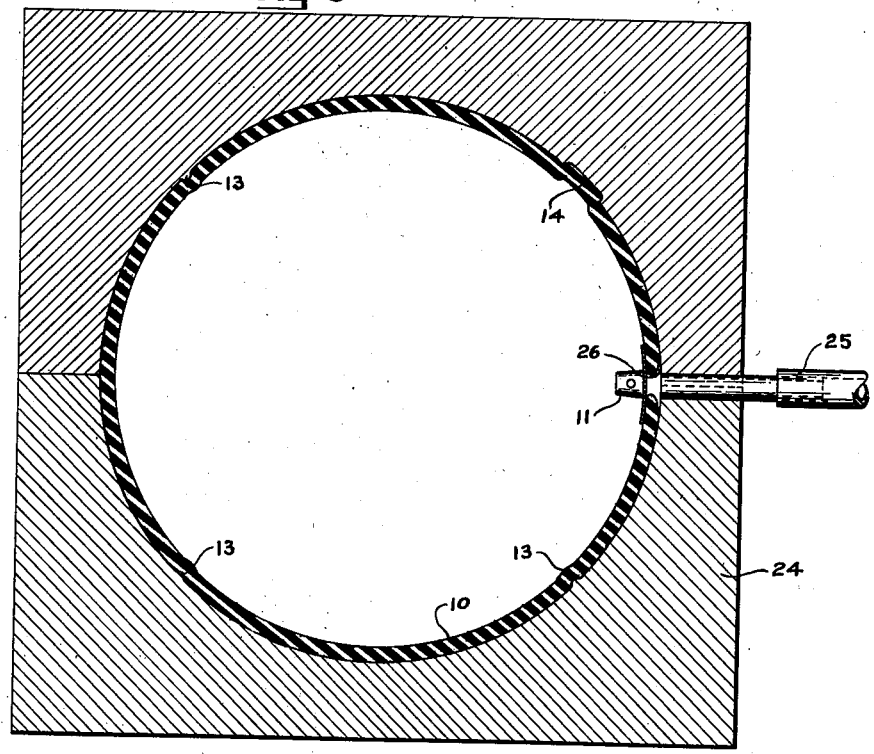
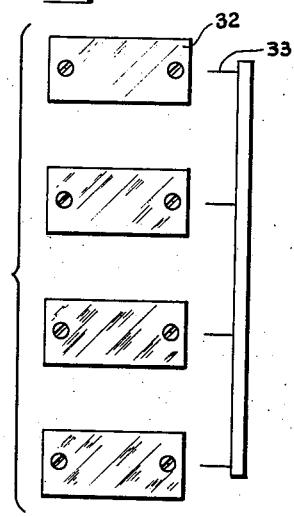
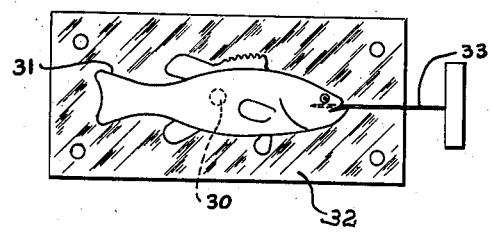
INVENTOR
F. H. Schavoir
BY A. H. Golden
ATTORNEY Patented Mar. 5, 1940

2,192,507

UNITED STATES PATENT OFFICE 2,192,507

METHOD OF MAKING RUBBER ARTICLES

Frederick H. Schavoir, Stamford, Conn.

Application August 19, 1935, Serial No. 36,846

5 Claims. (Cl. 18—56)

My invention relates to the manufacture of hollow rubber articles, such as balls and other devices. The invention deals especially with the manufacture of a particularly shaped and outlined ball containing a valve whereby it may be inflated or deflated at will. More particularly, my invention relates to the forming of a football of rubber and in adapting it to look like a football and to act like a football.

In the patent to Schavoir, No. 1,441,603, issued January 9, 1923, there is disclosed a method of the manufacture of a "biscuit", which is later to be vulcanized. The invention in that patent is exceedingly important and contributed to the art a process for manufacturing cheaply, hollow rubber articles having walls of uniform thickness throughout. In the forming of a biscuit for a football to have an inflation valve therein, it will be readily appreciated that if the valve is inserted prior to the forming process described in the Schavoir patent, it will be practically impossible to prevent the stretching of the rubber away from the valve during the forming process. If the valve is of a shape which will permit its insertion after the forming process described in the said Schavoir patent, then, when further pressure is applied to the walls of the rubber article during the final vulcanization process, there will be a pulling away of the wall surface of the ball from the valve, as will be readily appreciated by those skilled in the art.

I have invented a method of forming a ball and vulcanizing the same which comprises the utilization of means for preventing the stretching away of the walls of the ball from my valve during the forming of the biscuit under the teachings of the Schavoir patent, and during the actual vulcanizing of the ball under high pressure.

In carrying out my process, I apply a relatively non-stretching material to the surface of the biscuit adjacent the valve so that both during the biscuit forming process described in the Schavoir patent and during the vulcanization process, there will be no stretching of the wall of the ball from the valve structure. While, of course, I have referred to a valve, it may be that in some cases other types of devices may be required to be vulcanized to the ball surface or to the surface of some other type of rubber article. It is also possible that other uses for my particular method of preventing the stretching of the walls of a rubber article during forming and vulcanizing will occur to those skilled in the art. I therefore do not wish to have my invention limited to use in a football and for the insertion of merely a pressure valve.

It is desirable in the final vulcanization of the ball, that the adjacent outer surface of the ball and the outer surface of the valve be continuous without a line of demarcation or any difference in level. By mounting my valve relatively to the ball so that during vulcanization the outer surface of the valve as well as the outer surface of the ball are both in contact with the mold surface, I am able to vulcanize the ball so that the valve and ball surfaces will run into one another and form between them a continuous surface.

While imitation leather footballs made of rubber have been developed in the art, such balls have never had the true shape of a football and have never been manufactured commercially to show the seam lines which normally are located on the surface of a football, nor the lacing which is present in the ordinary leather football. The lacing serves an added function from that of merely holding the parts of a leather ball together, since it forms a protuberance to permit of the throwing of the ball. Because of the particular process I use for vulcanizing, I am able to form protuberances in the form of lacings which may later be colored as lacings and which will serve the function of permitting the thrower of the ball to obtain a secure hold, and will give the appearance of a real leather football. Similarly, because of the particular process I utilize, I am able to form depressions simulating the seams, which in a leather football hold the portions of the football together. All of this I believe to be novel in a ball of the type described.

It is desirable in the forming of articles of this type and also articles that have no valves, to remove the vulcanized article from the vulcanizing mold while the article and mold are still hot in order that a new article to be vulcanized may be placed in the mold without the mold being cooled down so as to require a considerable amount of reheating. Where, however, internal gasses are used to press the vulcanized article against the vulcanizing mold, the external heat developed creates great pressure and if the mold is opened while it and the gasses are still heated, this great pressure will destroy the article vulcanized. I have therefore devised a process of piercing each vulcanized article while it is still in the mold. This relieves the high pressure within the article so that the mold may then be opened and the article removed. This is an important contribution of my invention, since it permits of the removal of the vulcanized articles immediately upon the completion of the vulcanizing operation and makes it unnecessary to wait through the interval heretofore necessary to allow for a cooling of the mold and the drop in gas pressure accompanying the said cooling.

Figure 2:
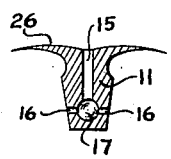
Figure 3:
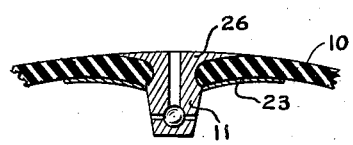
Figure 4:
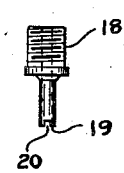
Figure 5:
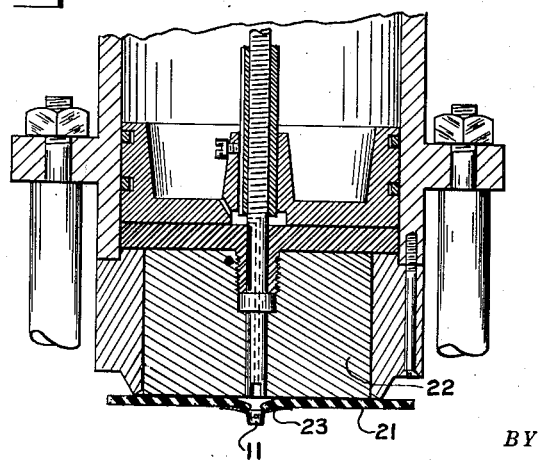

Referring now to the drawings, Fig. 1 is a top view of the football of my invention. Fig. 2 shows a valve used in my football. Fig. 3 shows the valve in vulcanized relation to the ball. Fig. 4 shows a tool utilized in connection with the valve of Fig. 2. Fig. 5 is a view similar to the Fig. 7 of the Schavoir patent, No. 1,441,603, showing the method of forming a biscuit in accordance with the teachings of my invention. Fig. 6 shows my football in a vulcanizing mold and being vulcanized. Figs. 7 and 8 show means for carrying out my article piercing process to permit the opening of the molds while hot.

Referring now more particularly to the drawings, reference numeral 10 indicates a football containing a valve 11 therein and formed as shown by reference numeral 12 to simulate leather. Because of the particular process I utilize, the football may also be formed as at 13 to simulate a seam and at 14 to simulate the usual thong lacing of a football.

In Fig. 2 I show a section through a valve utilized in my invention. This valve has a vertical passage 15 and two horizontal passages 16. A metal ball 17 may be entered through passage 15 so as to occupy the position shown in Fig. 2. In that position, it will prevent movement of air from passage 15 into passages 16. It will also obviously prevent the movement of air through passages 16 and out through passage 15. Whenever it is desired to inflate a ball using this valve, the tool 18 shown in Fig. 4 is inserted into passage 15 of the valve and its tip portion 19 contacts the metal ball 17 and moves it downwardly, after which the notch 20 may become aligned with the passages 16. An air hose may be applied thereafter to the screw threaded portion 18 and air may be permitted to enter the ball 10, as may be readily appreciated.

In Fig. 5 I show the forming of a biscuit for my football utilizing the process set forth in the Schavoir patent supra. Reference numeral 21 indicates the upper half of the biscuit through which protrudes the body 11 of my valve. It will be readily appreciated that if the piston 22 were drawn upwardly in Fig. 5 to stretch the biscuit portion 21, there would be a tendency for the biscuit around the valve 11 to be stretched away from that valve 11. In order to overcome this, I utilize an adhesive tape fabric 23, which could of course be any type of relatively non-stretching material, merely cemented to the biscuit, this material 23 being adapted to secure the material of the biscuit 21 from pulling away from the valve 11 during the operation of the piston 22.

Upon formation of a biscuit with a valve 11 contained therein, the biscuit may be put into a vulcanizing mold 24, such as shown in Fig. 6. At this point, of course, the valve 11 will not have therein a ball 17. Consequently, it is easy to apply to the valve 11 an air hose 25 which will inflate the ball 10, forcing its surface against the mold, as is seen in Fig. 6. The application of heat to the mold 24 will of course vulcanize the rubber and form the various seams 13 and thong lacings 14. It is interesting to note that the upper surface 26 of the valve 11 will be forced by the air pressure against the surface of the mold against which the outer surface of the biscuit itself is forced. Therefore, in the final vulcanized article, the outer surface of the ball and the outer surface 26 of the valve will lie so as to form one continuous surface without any line of demarcation to show the parting between the valve and the ball. In fact, the valve will be vulcanized somewhat together with the ball, and the flow of the rubber of the ball will be such that it will tend to equalize any difference in levels in the upper valve surface.

In Fig. 3 I illustrate a section showing the valve 11 and its upper surface 26 in relation to the vulcanized surface of the ball 10. The metal ball 17 of the valve is shown in place, it having been inserted after removal of the ball 19 from the mold 24. I also show the relation of the parts to the material 23 which has during all the operations maintained the rubber from stretching away from the valve.

In Figs. 6 and 7, I illustrate the process whereby when an internal gas generating tablet 30 is utilized rather than the external air hose 25 for shaping the rubber to the mold, it is possible to obtain a quick opening of the mold without having the high pressure caused by the heating of the mold break the particular molded article, which in this case is in the form of a fish 31. The series of molds 32 are arranged for the entry of a piercing tool 33 into each mold, this piercing tool acting to produce a deflation of the vulcanized article, as will be readily appreciated. Because of the resulting decrease of pressure, the mold may be opened, even though hot, the article removed, and a new biscuit inserted.

While I have illustrated particular embodiments of my invention and have described those embodiments in connection with certain types of vulcanization processes and in connection with certain phases of the vulcanizing art, I feel that I have developed a valuable contribution to this art, and I feel that I am entitled to a broad interpretation of the claims appended hereto.

I now claim:

1. The method of removing from a hot vulcanizing mold an article containing gas under high pressure generated as from a chemical tablet by the heat of the vulcanizing process and maintained at said high pressure by the heat of the mold, which consists in first piercing the article while it is still in the mold and the gases therein are under high pressure, and permitting escape of the high pressure gas, and thereafter opening the mold to remove the article.

2. The method of vulcanizing a biscuit with a wall having a perforation of definite fixed size which comprises applying and securing a relatively non-stretching material over the biscuit stock surrounding the perforation so that when the biscuit is expanded against its mold during the vulcanizing process, the biscuit stock will be held by said material against stretching or pulling away to enlarge the said perforation.

3. The method of making a part of a hollow article having a wall of uniform thickness throughout the area of said part and a valve or other device in said wall, which consists in placing stock over a form with the valve in said stock, applying a material to the stock surrounding the valve to prevent its stretching away from said valve, applying suction to the stock progressively from the periphery of the stock toward the center of the stock to evenly draw the stock into the form and without separating the stock from about the valve.

4. The method of making a part of a hollow article having a wall of uniform thickness throughout its area and a valve or other device in said wall, which consists in placing stock over a form with the valve in said stock, applying a material to the stock surrounding the valve to prevent its stretching away from said valve, and applying suction to the stock to evenly draw the same into the form, the suction being first applied to portions of the stock spaced from the center thereof, thence towards the center over a considerable area of the stock.

5. The method of removing from a hot vulcanizing mold a rubber article of the type formed by the generation of gas under high pressure within the article as by a chemical tablet, which gas pressure forces the rubber walls against the inner surfaces of the mold whereby the rubber assumes the shape of the mold, which method consists in first piercing the article while it is still in the mold and permitting escape from the inside of the article of the gas to relieve the pressure therein, and thereafter opening the mold to remove the article, whereby it becomes unnecessary to wait for the gas pressure to be relieved through the cooling of the vulcanized article in the mold.

FREDERICK H. SCHAVOIR.